Figure 2:
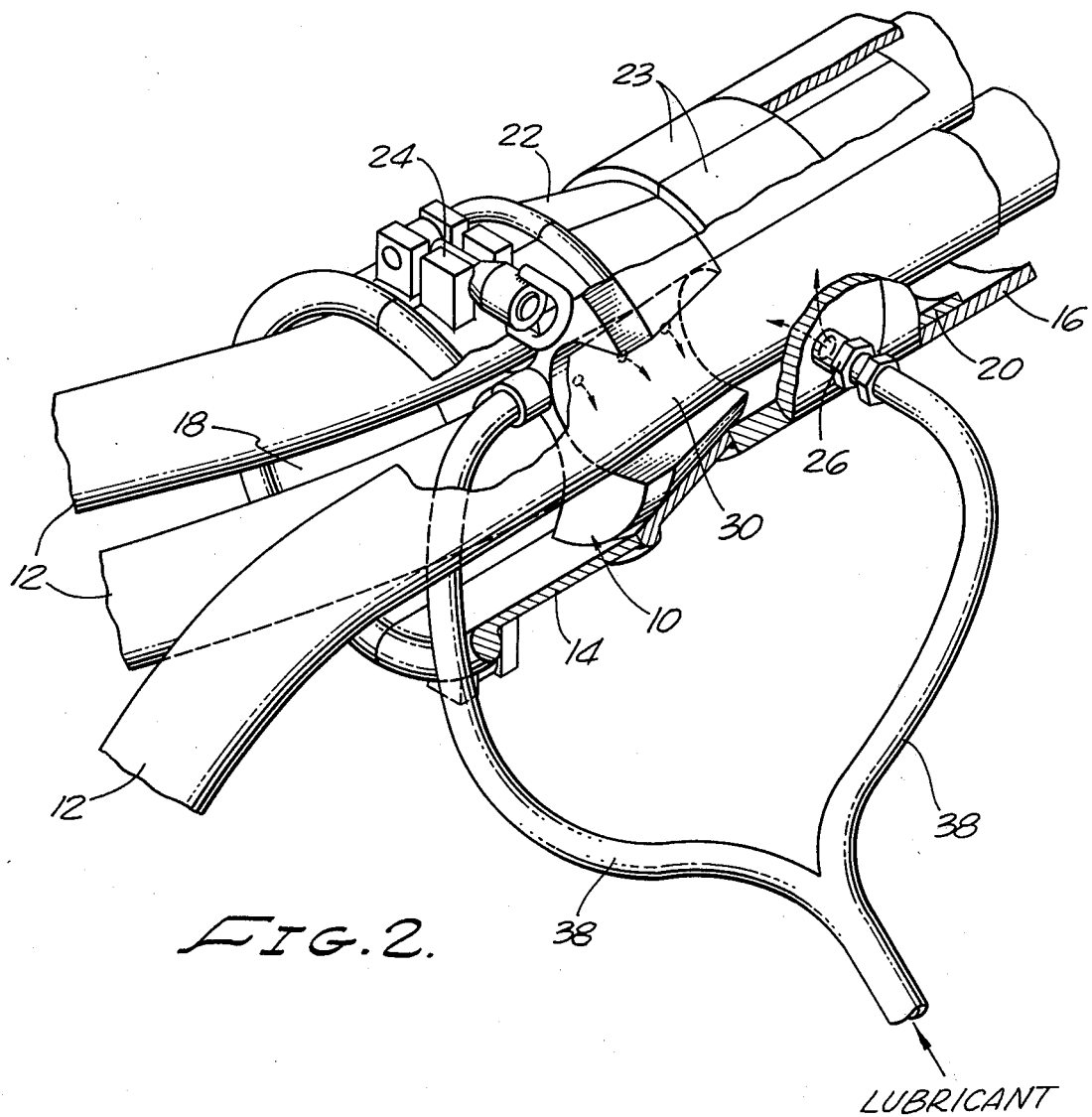

United States Patent [19]

Woodruff

[11] 4,331,322
[45] May 25, 1982

[54] CABLE LAYING APPARATUS

[76] Inventor: Harold F. Woodruff, 2340 Avocado Ter., Hacienda Heights, Calif. 91745

[21] Appl. No.: 124,132

[22] Filed: Feb. 25, 1980

[51] Int. Cl.³ .............................................. F16N 15/00
[52] U.S. Cl. .......................... 254/134.3 FT; 174/68 C; 184/15 R
[58] Field of Search ................. 184/15 R, 15 A, 15 B; 118/405; 254/134.3 R, 134.3 FT; 174/10, 68 C

[56] References Cited

U.S. PATENT DOCUMENTS 3,363,879  1/1968  Irik ........................... 254/134.3 FT
3,605,251  9/1971  Salerno et al. .................... 174/68 C
3,605,947  9/1971  Salerno et al. .................... 174/68 C
4,063,617  12/1977  Shenk ............................. 184/15 R Primary Examiner—Robert C. Watson
Attorney, Agent, or Firm—Lyon & Lyon

[57] ABSTRACT

A guide is used for simultaneously laying a plurality of cables in a conduit. The guide comprises a body portion sized to fit within the conduit, the body having a plurality of longitudinal channels along its periphery for forming a plurality of spaced-apart cable guide passages in cooperation with the internal wall of the conduit. A lubricant can be introduced into each channel.

14 Claims, 2 Drawing Figures

U.S. Patent May 25, 1982 4,331,322

LUBRICANT

CABLE LAYING APPARATUS

BACKGROUND

The present invention is directed to an apparatus for laying cables in conduits such as for laying electrical cables in underground ducts.

Electric utilities lay a large quantity of cables in underground ducts. Generally three cables are laid simultaneously for three-phase electrical power. A typical duct has an internal diameter of about 5 inches, and the cable diameter typically is about 1¾ inches for 1,000,000 circular mil cable. In order to lay three cables simultaneously, cable manufacturers provide three lengths of cables helically twisted about each other into what is commonly referred to as a "triplex" cable.

To lay the triplex cable, it is pulled through the conduit by means of a rope. At the feed end of the conduit, a split bell is provided for guiding the triplex. The bell is conventionally provided with a grease fitting for radial introduction of lubricant to aid in pulling the triplex cable through the conduit.

There are many problems with this type of system. For example, it is difficult to pull the triplex cable through a conduit because the lubricant is applied only on the exterior surface of the cables. The high pulling forces required can stretch the cables, resulting in broken strands and line discontinuities. Another disadvantage of triplexing is that it is expensive, costing about 15 to 20 cents per linear foot.

A further disadvantage of the triplex cable system is that there can be substantial wastage of cable. If 600 feet of triplex are ordered, but only 500 feet are actually required, there are 100 feet of the triplex cable left over. This leftover triplex cable has little, if any use, because it cannot be spliced to other triplex cable because a large splice cannot be pulled through a conventional underground duct.

Another problem with triplex cable is that most manufacturers only supply it in lengths up to about 900 feet, because that is the maximum that can be placed on a single reel. Therefore, for lengths longer than 900 feet, it is necessary to build splicing vaults into the underground duct system. The splicing vaults are expensive to construct, the labor for forming the splices is expensive, and the splices are often a source of line discontinuities.

In view of the problems associated with pulling triplex cable through a duct, it is evident that there is a need for a system that allows three cables to be laid in a duct easily, inexpensively, and with little waste cable.

SUMMARY

The present invention is directed to a system with these features. The system makes use of a guide that permits a plurality of cables to be simultaneously laid in a conduit. The guide comprises a body portion sized to fit within the conduit. The body has a plurality of longitudinal channels along its periphery for forming a plurality of circumferentially spaced-apart, longitudinally extending cable guide passages in cooperation with the internal wall of the conduit. The channels are sufficiently large that a cable can be pulled through each guide passage. The body is provided with means for introducing lubricant into each channel. This can be a lubricant duct extending longitudinally along the body with at least one lubricant passage or tube from the lubricant duct to each channel.

In use, the guide is placed into the conduit, thereby forming a plurality of spaced-apart guide passages. At least two cables are placed in the guide, each placed cable being in a separate guide passage. Lubricant is introduced into each passage and the guides are pulled through the conduit.

With the guide of the present invention, it is possible to introduce lubricant radically into each guide passage so that the internal surfaces of the cables, which rub against each other, are lubricated. In addition, lubricant can be introduced axially into the conduit.

The present invention overcomes the problems with the prior art triplexing system. Because of the radially outward introduction of lubricant into the guide passages, it is easy to pull the cables through the duct. It is no longer necessary to triplex the cable because each of the three cables can be provided on a separate reel and can be pulled individually and simultaneously into the duct through the guide. This eliminates the cost of triplexing and the wastage incurred with scrap triplex cable.

DRAWINGS

Figure 1:
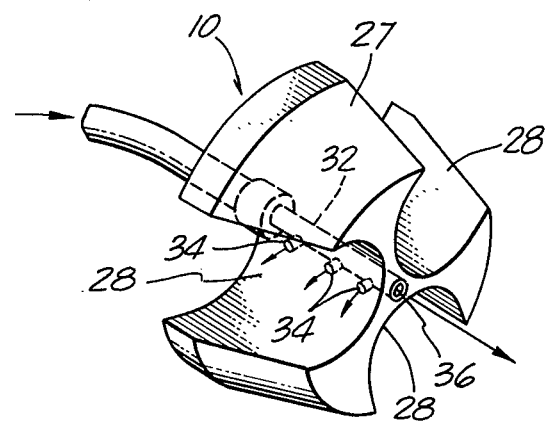

These and other features, aspects, and advantages of the present invention will become better understood with reference to the following description, appended claims, and accompanying drawings, where:

FIG. 1 is a perspective view of a guide according to the present invention; and

FIG. 2 schematically shows the guide of FIG. 1 being used for guiding three cables into a duct.

DESCRIPTION

With reference to the figures, the present invention is directed to a guide 10 for simultaneously laying a plurality of cables 12 in a conduit. The conduit shown in FIG. 2 comprises a hollow feed bell 14 and an underground duct 16. The hollow bell 14 is a bell conventionally used for feeding triplex cable into an underground duct. One end 18 of the bell has a relatively large diameter and the opposite end 20 has a relatively small diameter. The small diameter end 20 is sufficiently small to slide into the duct 16. The large diameter end 18 is sufficiently large that the cables 12 can be introduced thereinto without difficulty. The body portion 22 of the feed bell is tapered from the large diameter end 18 to the small diameter end 20. The body 22 of the bell is split longitudinally into two sections 23 held together by a conventional toggle apparatus 24. The bell is provided with at least one fitting 26 for introduction of lubricant into the interior of the bell in a radially inwardly direction.

The body 27 of the guide 10 is sized to fit within the bell 14, being tapered to conform to the taper of the body 22 of the bell 14.

The body 27 of the guide is provided with a plurality of longitudinal channels 28 along its periphery. As shown in the figures, the guide 10 generally has three channels 28, one for each of the electrical cables typically laid in an underground duct. When the guide 10 is placed within the bell, the channels cooperate with the internal wall of the bell to form cable guide passages 30. The guide passages 30 are sufficiently large so that cable can be fed through each passage.

The guide 10 is provided with a lubricant duct 32 coaxial with the longitudinal axis of the duct. To provide lubricant to each passage 30, three tubes 34 extend from the duct 32 radially outwardly to each passage 30. The tubes 34 are longitudinally spaced apart from each other so that lubricant can be introduced along the length of the entire passage 30. The lubricant duct 32 extends along the entire length of the guide 10 so that lubricant can be introduced axially into the bell 14 from the open end 36 of the lubricant duct 32.

With reference to FIG. 2, to use the guide 10, it is placed into the feed bell 14. This can be accomplished by opening the two sections 23 of the feed bell, placing the guide 10 between the two sections, and then closing the sections 23 together. Then the bell 14 with the guide 10 therein is placed into the duct 16.

The cables 12 are then placed into the bell through the passages 30 formed by the channels 28 and the internal wall of the bell. A lubricant supply tube 38, which can be formed of flexible rubber, is connected to the fitting 26 of the bell and to the lubricant duct 32 at the large diameter end 18 of the bell 14. While lubricant is being introduced, the three cables 12 are pulled simultaneously through the bell and the duct 16. Each cable 12 can be provided from a separate reel (not shown).

The lubricant used can be any lubricant conventionally used when pulling cable through a duct. A preferred lubricant for use in the present invention is a water-soluble, easily removed lubricant which does not affect the cable, such as Hydralube Blue available from Arnco of Youngstown, Ohio.

The guide can be made of any material that is not adversely affected by the lubricant, that does not hamper the pulling of the cables 12 through the duct, and that does not adversely affect the cables 12. The guide can be made of metal such as steel or a strong polymeric material such as polyethylene.

A guide 10 in accordance with the present invention has a length of about 3¼ inches, a diameter at its large end of about 7 inches, and a diameter at its small end of about 4½ inches. Its exterior is uniformly tapered. The channels 28 at the exterior surface of the guide 10 are about 2⅛ inches across. The channels are cut so that at the bottom they are not tapered, i.e., a line along the bottom of each channel is parallel to the longitudinal axis of the guide. The duct of each channel at the small end of the guide is about 2 inches and at the large end of the guide about 2¾ inches. Such a guide is useful for laying three 1,000,000 circular mil cables simultaneously in an underground conduit, each of the cables having a diameter of about 1¾ inches.

By using the guide of the present invention for simultaneously laying three cables in an underground conduit, many of the disadvantages of the prior art triplex system are eliminated. For example, the cost of winding three cables in a helix is not incurred. Furthermore, the cables 12 can be easily pulled in a duct, because lubricant is introduced radially inwardly, radially outwardly and axially onto the cables. The amount of waste cable is reduced because left over cable, since it is not wound about other cable, can be reused.

Other advantages of using the guide of the present invention includes less axial elongation and less chance of breaking strands of the cable due to the improved lubrication, and particularly the internal lubrication of the cables. This results because less force is needed for pulling the cables.

A further advantage of the present invention is that long lengths can be pulled without requiring splicing. For example, three cables, each 2100 feet in length, each being on its own reel, can be used to lay cable in a 2100 feet underground duct. If a conventional triplex cable system were used, it would be necessary to lay at least two separate lengths of triplex cable with a splice between the individual lengths. Such a splice would require expensive labor, and a costly splicing vault.

Although the present invention has been described in considerable detail with reference to certain preferred versions thereof, other versions are possible. For example, a guide can be used directly in an underground duct, dispensing with the need for a feed bell 14. Therefore, the spirit and scope of the appended claims should not necessarily be limited to the description of the preferred versions contained herein.

What is claimed is:

1. A guide for simultaneously laying a plurality of cables in a conduit comprising;
   (a) a body sized to fit within a conduit into which cables are laid, the conduit comprising an underground duct and a feed bell, the body being tapered to fit within the bell, the body having a plurality of longitudinal channels along its periphery for forming a plurality of spaced-apart cable guide passages in cooperation with the internal wall of the conduit, the channels being sufficiently large that a cable can be pulled through each guide passage; and
   (b) means for introducing a lubricant into each channel.

2. A guide for simultaneously laying a plurality of cables in a conduit comprising:
   (a) a body sized to fit within a conduit into which cables are laid, the body having a plurality of longitudinal channels along its periphery for forming a plurality of spaced-apart cable guide passages in cooperation with the internal wall of the conduit, the channels being sufficiently large that a cable can be pulled through each guide passage; and
   (b) means for introducing a lubricant into each channel comprising a lubricant duct extending longitudinally along the body and at least one hole from the lubricant duct to each channel.

3. The guide of claim 1 wherein the means for introducing a lubricant comprises a lubricant duct extending longitudinally along the body and at least one hole from the lubricant duct to each channel.

4. The guide of claim 3, 1 or 2 wherein the lubricant duct extends through to the end of the body so that lubricant can be introduced axially into the conduit.

5. The guide of claim 1 comprising two channels.

6. The guide of claim 1 comprising three channels.

7. Apparatus for simultaneously laying at least three electrical cables in a duct comprising:
   (a) a feed bell having one end adapted to fit within the duct;
   (b) a guide sized to fit within the bell, the guide having at least three longitudinal channels along its periphery for forming at least three circumferentially spaced-apart, longitudinally extending cable guide passages in cooperation with the internal wall of the bell, the channels being sufficiently large that a cable can be pulled through each guide passage;
   (c) a lubricant duct extending longitudinally along the body for axial introduction of lubricant into the bell; and
   (d) at least one hole from the lubricant duct to each passage for introducing lubricant radially outwardly into each guide passage.

8. A method for simultaneously laying a plurality of cables in a conduit comprising the steps of:
   (a) placing a guide having a plurality of longitudinal channels along its periphery into the conduit, the channels in cooperation with the internal walls of the conduit forming a plurality of spaced-apart longitudinally extending cable guide passages, each channel being sufficiently large that a cable can be pulled through each guide passage;
   (b) placing at least two cables in the guide, each placed cable being in a separate guide passage;
   (c) introducing lubricant into each guide passage by introducing lubricant radially outwardly into each guide passage; and
   (d) pulling the placed cables simultaneously into the conduit.

9. A method for simultaneously laying a plurality of cables in a conduit comprising the steps of:
   (a) placing a guide having a plurality of longitudinal channels along its periphery into the conduit, the channels in cooperation with the internal walls of the conduit forming a plurality of spaced-apart cable guide passages, each channel being sufficiently large that a cable can be pulled through each guide passage;
   (b) placing at least two cables in the guide, each placed cable being in a separate guide passage;
   (c) introducing lubricant radially outwardly into each guide passage and introducing lubricant axially into the conduit; and
   (d) pulling the placed cables simultaneously into the conduit.

10. A method for simultaneously laying a plurality of cables in a conduit comprising the steps of:
    (a) placing a guide having a plurality of longitudinal channels along its periphery into the conduit, the channels in cooperation with the internal walls of the conduit forming a plurality of spaced-apart cable guide passages, each channel being sufficiently large that a cable can be pulled through each guide passage;
    (b) placing at least two cables in the guide, each placed cable being in a separate guide passage;
    (c) introducing lubricant into each guide passage and introducing lubricant axially into the conduit; and
    (d) pulling the placed cables simultaneously into the conduit.

11. The method of claim 8 or 10 wherein the step of introducing lubricant comprises introducing lubricant radially inwardly into the conduit.

12. A guide for simultaneously laying a plurality of cables in a conduit comprising:
    (a) a body sized to fit within a conduit into which cables are laid, the body having a plurality of longitudinal channels along its periphery for forming a plurality of spaced-apart cable guide passages in cooperation with the internal wall of the conduit, the channels being sufficiently large that a cable can be pulled through each guide passage; and
    (b) means for introducing a lubricant into each channel and a lubricant duct extending longitudinally along the body to the end of the body so that lubricant can be introduced axially into the conduit.

13. A guide for simultaneously laying a plurality of cables in a conduit comprising:
    (a) a body sized to fit within a conduit into which cables are laid, the conduit comprising an underground duct and a feed bell, and wherein the body of the guide is tapered to fit within the bell, the body having a plurality of longitudinal channels along its periphery for forming a plurality of spaced-apart cable guide passages in cooperation with the internal wall of the conduit, the channels being sufficiently large that a cable can be pulled through each guide passage; and
    (b) means for introducing a lubricant into each channel comprising a lubricant duct extending longitudinally along the body and at least one hole from the lubricant duct to each channel, the lubricant duct extending through to the end of the body so that lubricant can be introduced axially into the conduit.

14. A method for simultaneously laying a plurality of cables in a conduit comprising the steps of:
    (a) placing a guide having a plurality of longitudinal channels along its periphery into the conduit, the channels in cooperation with the internal walls of the conduit forming a plurality of spaced-apart cable guide passages, each channel being sufficiently large that a cable can be pulled through each guide passage;
    (b) placing at least two cables in the guide, each placed cable being in a separate guide passage;
    (c) introducing lubricant into each guide passage by introducing lubricant radially outwardly into each guide passage, introducing lubricant axially into the conduit, and introducing lubricant radially inwardly into the conduit.

* * * * *